(12) United States Patent
Messner et al.

(10) Patent No.: US 12,658,497 B2
(45) Date of Patent: Jun. 16, 2026

(54) SECONDARY BATTERY PACK WITH IMPROVED THERMAL MANAGEMENT

(71) Applicant: Elkem Silicones USA Corp., East Brunswick, NJ (US)

(72) Inventors: Kathryn Elizabeth Messner, Lake Wylie, SC (US); Yan Meng, Rock Hill, SC (US); John Albaugh, Fort Mill, SC (US); Matthew Kihara, Camarillo, CA (US); Scott Jackson, Rock Hill, SC (US); Virginia O'Neil, York, SC (US)

(73) Assignee: Elkem Silicones USA Corp., East Brunswick, NJ (US)

( * ) Notice: Subject to any disclaimer, the term of this patent is extended or adjusted under 35 U.S.C. 154(b) by 789 days.

(21) Appl. No.: 17/819,309

(22) Filed: Aug. 11, 2022

(65) Prior Publication Data

US 2023/0060699 A1      Mar. 2, 2023

Related U.S. Application Data

(60) Provisional application No. 63/335,043, filed on Apr. 26, 2022, provisional application No. 63/314,224,
(Continued)

(51) Int. Cl.
*H01M 10/653* (2014.01)
*H01M 10/0525* (2010.01)
(Continued)

(52) U.S. Cl.
CPC ..... *H01M 10/653* (2015.04); *H01M 10/0525* (2013.01); *H01M 10/613* (2015.04); *H01M 10/625* (2015.04); *H01M 10/643* (2015.04);

*H01M 10/658* (2015.04); *H01M 50/213* (2021.01); *H01M 50/227* (2021.01); *H01M 50/24* (2021.01); *H01M 50/249* (2021.01); *H01M 50/293* (2021.01); *H01M 2220/20* (2013.01)

(58) Field of Classification Search
None
See application file for complete search history.

(56) References Cited

U.S. PATENT DOCUMENTS

| 8,367,233 B2 | 2/2013 | Messner et al. |
| 2007/0259258 A1 | 11/2007 | Buck |

(Continued)

FOREIGN PATENT DOCUMENTS

| DE | 202005010708 U1 | 9/2005 | |
| DE | 102007010751 A1 * | 8/2008 | .......... H01M 10/658 |

OTHER PUBLICATIONS

EV Protect 4006 SFR Technical Data Sheet (Year: 2021).*
Machine Translation of DE 102007010751A1 (Year: 2008).*

*Primary Examiner* — Gregg Cantelmo
(74) *Attorney, Agent, or Firm* — McBee Moore & Vanik IP, LLC

(57) ABSTRACT

The present invention relates to a novel secondary battery pack with improved thermal management useful for an all-electric vehicle (EV), a plug-in hybrid vehicle (PHEV), a hybrid vehicle (HEV), or battery packs used for other vehicles batteries, and more particularly, to the use of a specific material for thermally insulating a secondary battery pack and further minimizing the propagation of thermal runaway within a battery pack.

21 Claims, 5 Drawing Sheets

Related U.S. Application Data filed on Feb. 25, 2022, provisional application No. 63/233,057, filed on Aug. 13, 2021.

(51) Int. Cl.

| | |
|---|---|
| *H01M 10/613* | (2014.01) |
| *H01M 10/625* | (2014.01) |
| *H01M 10/643* | (2014.01) |
| *H01M 10/658* | (2014.01) |
| *H01M 50/213* | (2021.01) |
| *H01M 50/227* | (2021.01) |
| *H01M 50/24* | (2021.01) |
| *H01M 50/249* | (2021.01) |
| *H01M 50/293* | (2021.01) |

(56) References Cited

U.S. PATENT DOCUMENTS

| | | |
|---|---|---|
| 2012/0003508 A1 | 1/2012 | Narbonne et al. |
| 2016/0226042 A1* | 8/2016 | Hartmann ........... H01M 50/213 |
| 2018/0223070 A1 | 8/2018 | O'Neil et al. |

* cited by examiner

102

103

104

A

105

B

SECONDARY BATTERY PACK WITH IMPROVED THERMAL MANAGEMENT

CROSS-REFERENCE TO RELATED PATENT APPLICATIONS

This patent application claims priority to U.S. Provisional Patent Application No. 63/335,043, filed on Apr. 26, 2022, U.S. Provisional Patent Application No. 63/233,057, filed on Aug. 13, 2021, and U.S. Provisional Patent Application No. 63/314,224, filed on Feb. 25, 2022 the disclosure of each of which are incorporated herein in its entirety.

FIELD OF THE INVENTION

The present invention relates to a novel secondary battery pack, in particular those comprising lithium-ion battery cells, with improved thermal management allowing the use under extended conditions of temperature extremes. More particularly, the invention relates to the use of a specific isocyanate-based material (polyurethanes, polyureas, polyisocyanurates and mixtures thereof), for thermally insulating a secondary battery pack and further minimizing the propagation of thermal excursions within a battery pack. Said secondary battery pack could be used in an all-electric vehicle (EV), a plug-in hybrid vehicle (PHEV), a hybrid vehicle (HEV), or for other vehicles batteries.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery. Examples of the secondary batteries may include nickel-cadmium batteries, nickel-metal hybrid batteries, nickel-hydrogen batteries, lithium secondary batteries, etc.

Secondary batteries, in particular lithium-ion batteries, have emerged as a key energy storage technology and are now the main technology for consumer electronics devices, industrial, transportation, and power-storage applications.

Due to their high potential and their high energy and power densities, and also their good lifetime, secondary batteries are now the preferred battery technology, in particular in the automotive industry as it is now possible to provide longer driving range and suitable acceleration for electrically propelled vehicles such as Hybrid Electric Vehicles (HEVs), Battery Electric Vehicles (BEVs) and Plug-In Hybrid Electric Vehicles (PHEVs). In current automotive industry, different sizes and shapes of lithium-ion battery cells are being manufactured and are subsequently assembled into packs of different configurations. An automotive secondary battery pack typically consists of a large number of battery cells, sometimes several hundreds, even thousands, to meet desired power and capacity needs.

This switch in drive train technology is not, however, without its technological hurdles as the use of an electric motor translates to the need for inexpensive batteries with high energy densities, long operating lifetimes, and capability of operating in a wide range of conditions. Although rechargeable battery cells offer a number of advantages over disposable batteries, this type of battery is not without its drawbacks.

In general, most of the disadvantages associated with rechargeable batteries are due to the battery chemistries employed, as these chemistries tend to be less stable than those used in primary cells. Under normal power/current loads and ambient operating conditions, the temperature within most Li-ion cells is controlled by thermal management system to remain in a range of 20° C. to 55° C. However, adverse conditions such as high-power draw at high cell temperatures, chemical misfunction within individual cells may increase local heat generation. In particular, above a critical temperature, exothermic chemical reactions within the cell are activated and heat generation becomes much greater than the extraction of heat by the thermal management system. This phenomenon known as "thermal runaway" is now commonly referring to the sudden, rapid increase in cell temperature and pressure due to various operational factors leading to propagation of excessive temperature throughout a battery module. Thermal runaway can lead to cell venting and internal temperatures in excess of 200° C. During lithium-ion battery thermal abuse tests, maximum cell surface temperature for fully charged, cylindrical, type 18650 lithium-ion batteries have been reported in the range 310° C. to 870° C. Measured flame temperatures as high as 1060° C. for single cells and 1500° C. for a battery module contained a set of cells have also been reported. As a result, power from the battery pack is interrupted and the system employing the battery pack is more likely to incur extensive collateral damage due to the scale of damage and the associated release of thermal energy.

Due to the increased temperature of the cell undergoing this temperature increase, the temperature of adjacent cells within the battery pack will also increase. If the temperature of these adjacent cells is allowed to increase unimpeded, they may also enter into an unacceptable state with exceedingly high temperatures within the cell, leading to a cascading effect where the initiation of temperature increases within a single cell propagate throughout the entire battery pack.

Furthermore, due to the characteristics of the lithium-ion batteries, the secondary battery pack operates within an ambient temperature range of −20° C. to 60° C. However, even when operating within this temperature range, the secondary battery pack may begin to lose its capacity or ability to charge or discharge should the ambient temperature fall below 0° C. Depending on the ambient temperature, the life cycle capacity or charge/discharge capability of the battery may be greatly reduced as the temperature stays below 0° C. Nonetheless, it may be unavoidable that the lithium-ion battery be used where the ambient temperature falls outside the optimum ambient temperature range which is between 20° C. to 25° C. These factors not only greatly shorten the driving range of vehicle, but also cause a great damage to battery. Deterioration in energy and power available at lower temperatures is attributed to reduction in capacity and increase in internal resistance.

Alluding to the above, in a battery pack or in a battery module with multiple cells, significant temperature variances can occur from one cell to the next, which is detrimental to performance of the battery pack. To promote long life of the entire battery pack, the cells must be below a desired threshold temperature. To promote pack performance, the differential temperature between the cells in the secondary battery pack should be minimized. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to decline in the performance of the entire secondary battery pack.

Several approaches have been employed to either reduce the risk of thermal issues or reduce the risk of thermal propagation. These can be found in U.S. Pat. No. 8,367,233 which discloses a battery pack thermal management system that comprises at least one enclosure failure port integrated into at least one wall of a battery pack enclosure, where the enclosure failure port(s) remains closed during normal operation of the battery pack, and opens during a battery pack thermal event, thereby providing a flow path for hot gas generated during the thermal event to be exhausted out of the battery pack enclosure in a controlled fashion.

Another approach is to develop new cell chemistries and/or modify existing cell chemistries. Yet another approach is to provide additional shielding at the cell level, thus inhibiting the flow of thermal energy from the cell undergoing thermal management issues propagating to adjacent cells. Still yet another approach, is to use a spacer assembly to maintain the position of the battery undergoing the thermal event in its predetermined location within the battery pack, thereby helping to minimize the thermal effects on adjacent cells.

Thermally insulating a battery pack has also been described to reduce the risk of thermal excursions or their propagation. For example, document US-A-2007/0259258 describes a battery of lithium generators in which the generators are stacked one on another and this stack is held in position being surrounded by polyurethane foam. An embodiment is also disclosed in which cooling fins are inserted between two generators.

Document DE-A-202005010708 describes a starter lead-acid electrochemical generator and an electrochemical generator for industrial use whose housing contains plastic foam such as polypropylene or polyvinyl chloride having closed pores.

Document US-A-2012/0003508 describes a battery of lithium electrochemical generators including a casing; a plurality of lithium electrochemical generators housed in the casing, each generator including a container; a rigid flame-retardant foam with closed porosity formed of an electrically insulating material filling the space between the inner wall of the casing and the free surface of the side wall of the container of each electrochemical generator, the foam covering the free surface of the side wall of the container of each electrochemical generator over a length representing at least 25% of the height of the container. According to one embodiment, the rigid flame-retardant foam consists of a material chosen from the group comprising polyurethane, epoxy, polyethylene, melamine, polyester, polystyrene, silicone or polyurethane and the mixture of polyurethane and epoxy being preferred. The expansion of polyurethane resin for foam-form is described using the following chemical routes to obtain the foam:

a) via chemical route, i.e., the reaction of water on isocyanate producing $CO_2$ which will cause the polyurethane to foam, b) via physical route, i.e., vaporization of a liquid with low boiling point under the action of heat produced by the exothermal reaction between isocyanate and the hydrogen-donor compound, or c) via injection of air.

While a number of approaches have been adopted to try to lower the risk of thermal incursions as well as thermal energy propagation throughout the battery pack, it is critical that if a pack-level thermal event does occur, personal and property risks are minimized. As the number and the size of cells in a battery is increasing, so does the necessity and benefit of providing suitable thermal management is also awaited.

Furthermore, there is a new trend for designing battery packs which consist of not using modules and instead builds the entire battery pack as the structural platform of the vehicle, with the battery cells helping to solidify the platform as one large unit. This new design reduces the complexity of the existing battery packs and the total mass of the battery pack, and therefore enables to improve efficiency and ultimately the range of electric vehicles. With such approach there is a strong need for thermally insulating the cells with an interstitial fill material which has also additional appropriate structural adhesive properties. The durability of a structural adhesive which will also function as an interstitial fill is determined by its capability to evenly distribute stress induced by vibrations arising from road surfaces when the vehicle is moving or to resist the impact of a vehicle crash. The performance of a structural adhesive will also depend upon the modulus of the substrates as well as the tensile strength properties of the structural adhesive. Indeed, when a load force is applied to a structural adhesive it has to exhibit a good ability to resist breaking under pressure. The lap shear strength is the ability of an adhesive to resist forces in the plane of the bonded surfaces. Bonded structural adhesives are typically designed so that the adhesive is only subjected to in-plane forces, resulting in shear stress in the adhesive. Therefore, there is a strong need for providing such interstitial fill for providing adequate structural adhesive properties such as good lap shear strength and tensile strength properties and for additionally thermally insulating the cells within a battery pack. Indeed, it is essential that the battery pack frame stays strong and crash resistant to protect the battery cells, and more importantly, vehicle occupants Furthermore, as the trends is for using interstitial fills with structural adhesive properties in battery pack of vehicles which are used for transportation, good thermal insulative properties and low density are also required. Therefore, a lighter version of such interstitial fill having structural adhesive properties, low density with good thermal insulation property is also awaited by battery pack manufacturers.

In this context, one of the essential objectives of the present invention is to provide a new battery pack that will provide suitable thermal management and minimize personal, and property risks due to uncontrolled thermal events as it is still awaited. It is also required that suitable thermal management will be possible for the duration of the life cycle of the battery.

Another essential objective of the invention is to provide a new battery pack that will include a material useful for thermal insulation of the cells and/or the battery pack and which possesses good structural adhesive properties such as good lap shear strength and tensile strength properties improving crash resistance of the structure to protect the battery cells, and more importantly, vehicle occupants.

Another essential objective of the invention is to provide a lighter version of such material to respond to the needs of using lighter materials in vehicles using battery pack containing secondary battery cells to maximize their driving range autonomy before the battery needs to be recharged.

With the present invention, it is sought that the claimed secondary battery pack will address said problems presented above.

All these objectives, among others, are achieved by the present invention, which relates to a secondary battery pack 100 comprising:

- a battery pack enclosure 101 composed of an enclosure top panel 104 and an enclosure bottom panel 102 which when sealed to each other provide a substantially airtight battery pack enclosure 101,
- at least one array of battery cells 103 within said enclosure bottom panel 102 which are electrically connected to one another and are arranged in an upright manner such that axes of the cells are parallel to each other,
- an isocyanate-based material A which fills partially or fully the open space of said battery pack enclosure 101 and/or fills partially or fully the open space within said array of battery cells 103 and/or covers partially or totally said battery cells 103, and wherein said isocyanate-based material A is prepared by mixing and curing a composition X comprising:
  - (a) at least one isocyanate compound,
  - (b) at least one organic compound having at least two epoxy groups or at least one active hydrogen-containing compound or a mixture of active hydrogen-containing compounds selected from the group consisting of polyols, polyamines, polyamides, polyimines and polyolamines.
  - (c) at least one catalyst,
  - (d) eventually at least one blowing agent,
  - (e) eventually at least one adhesion promoter, and
  - (f) eventually at least one additive,
  - and wherein for 100 parts by weight of composition X it further comprises from 0.1 part by weight to 30 parts by weight, preferably from 0.1 part by weight to 20 parts by weight, and even more preferably from 4.5 parts by weight to 30 parts by weight of at least one organopolysiloxane polymer Y comprising either as a terminal group or as a pendant group at least one polyoxyalkylene moiety end-capped by a hydroxyl group.

To achieve these objectives, the Applicant demonstrated, to its credit, entirely surprisingly and unexpectedly, that within formulations which are precursors of materials such as polyurethanes, polyureas, polyisocyanurates (or mixtures thereof), adding an organopolysiloxane polymer Y comprising a specific polyoxyalkylene moiety end-capped by a hydroxyl group improves the structural adhesive properties of said material which can also be used as an interstitial fill material for thermally insulating cells within a battery pack. The choice of the material according to the invention makes it possible to overcome problems that were not solved by similar batteries using pure organic polyurethane material.

In another preferred embodiments for 100 parts by weight of composition X it further comprises from 0.1 part by weight to 25 parts by weight, preferably from 4.5 parts by weight to 25 parts by weight, preferably from 1 part by weight to 15 parts by weight and preferably from 2.5 parts by weight to 10 parts by weight of at least one organopolysiloxane polymer Y comprising either as a terminal group or as a pendant group at least one polyoxyalkylene moiety end-capped by a hydroxyl group.

The material according to the invention has the advantage of having good structural adhesive properties with improved tensile strength properties and good lap shear strength which is the ability of the material to resist forces in the plane of the bonded surfaces improving crash resistance of the structure to protect the battery cells, and more importantly, vehicle occupants. The bonding of parts using structural adhesive according to the invention provides significant benefits as the adhesive distributes the loads and stresses acting on the total bond area instead of concentrating them on a single point or on a specific area of the bond area, allowing a uniform distribution of static and dynamic loads and hence reducing the vibration levels of assemblies within a secondary battery pack.

Furthermore, it is well known that the driving range of an electric vehicle between charges is calculated at ambient temperature. Electric vehicle drivers are being made aware that frigid temperature reduces the available mileage. This loss is not only caused by heating the cabin electrically but by the inherent slowing of the battery's electrochemical reaction, which reduces the capacity while cold. So, the specific choice of the material according to the invention makes it possible for said material to exhibits improved thermal insulation properties.

As differences in temperatures affect the resistance, self-discharge rate, coulombic efficiency, as well as the irreversible capacity and power fade rates of battery cells, over a wide range of chemistries, the secondary battery pack according to the invention allows for uniform thermal conditions for all cells in a battery pack or module. The likelihood of cell state of charge imbalance and of early failure of non-defective cells is therefore further minimized.

According to a preferred embodiment, the organopolysiloxane polymer Y comprises either as a terminal group or as a pendant group at least one polyoxyalkylene moiety end-capped by a hydroxyl group and wherein the polyoxyalkylene moiety has an average molecular weight of from 300 to 4000 g/mol, preferably from 300 to 3500 g/mol and even more preferably from 300 to 3000 g/mol.

According to another preferred embodiment, the organopolysiloxane polymer Y comprises, either as a terminal group or as a pendant group, polyoxyalkylene moieties end-capped by a hydroxyl group and said organopolysiloxane polymer Y having the generalized average formula:

$$MD_xD^*_yT^*_zM$$

wherein
- M represents: $(R)_3SiO_{1/2}$ or $R^1(R)_2SiO_{1/2}$;
- D represents $(R)_2SiO_{2/2}$;
- D* represents $(R^1)(R)SiO_{2/2}$;
- T* represents $(R^1)SiO_{3/2}$
- x is from 5 to 220,
- y is from 2 to 50,
- z is from 0 to 50,
- R is an alkyl group chosen from the group consisting of methyl, ethyl, propyl, trifluoropropyl, and phenyl, and most preferably R is a methyl group,
- $R^1$ is a hydroxyl-terminated polyether moiety of general formula $—C_nH_{2n}O—(C_2H_4O)_a—(C_3H_6O)_bH$, wherein n is 3 or 4, a>0 and b≥0 and wherein a and b are defined so that the average molecular weight is from 300 to 4000 g/mol, preferably from 300 to 3500 g/mol and even more preferably from 300 to 3000 g/mol.

According to another preferred embodiment, the organopolysiloxane polymer Y comprises either as a terminal group or as a pendant group, polyoxyalkylene moieties end-capped by a hydroxyl group and having the generalized average formula $$MD_xD^*_yM$$

wherein
- M represents: $(R)_3SiO_{1/2}$ or $R^1(R)_2SiO_{1/2}$;
- D represents $(R)_2SiO_{2/2}$;
- D* represents $(R^1)(R)SiO_{2/2}$;
- x is from 5 to 220,

7 y is from 2 to 50,

R is an alkyl group chosen from the group consisting of methyl, ethyl, propyl, trifluoropropyl, and phenyl, and most preferably R is a methyl group, and $R^1$ is a hydroxyl-terminated polyether moiety of general formula —$C_nH_{2n}O$—$(C_2H_4O)_a$—$(C_3H_6O)_b$H, wherein n is 3 or 4, a>0 and b≥0 and wherein a and b are defined so that the average molecular weight of from 300 to 4000 g/mol, preferably from 300 to 3500 g/mol and even more preferably from 300 to 3000 g/mol.

According to another preferred embodiment, the composition X is free of organopolysiloxane polymer Y comprising polyoxyalkylene branches of average molecular weight above 4000 g/mol, preferably is free of organopolysiloxane polymer Y comprising polyoxyalkylene branches of an average molecular weight above 3500 g/mol and even more preferably is free of organopolysiloxane polymer Y comprising polyoxyalkylene branches of an average molecular weight above 3000 g/mol.

According to another preferred embodiment, the composition X is free of organopolysiloxane polymer Y comprising polyoxyalkylene moieties having alcoxy end-groups.

According to another preferred embodiment, $R^1$ is a hydroxyl-terminated polyether branch of general formula —$C_nH_{2n}O$—$(C_2H_4O)_a$—$(C_3H_6O)_b$H, wherein n is 3 or 4, a is from 1 to 85, preferably from 5 to 60, and b is from 0 to 65, preferably from 4 to 60, and wherein a and b are defined so that the average molecular weight is from 300 to 4000 g/mol, preferably from 300 to 3500 g/mol and even more preferably from 300 to 3000 g/mol.

According to another preferred embodiment, the molar ratio a/b is from 0.1 to 20, and preferably from 0.5 to 10, and even more preferably from 0.5 to 5.

Methods of preparing polydiorganosiloxane-polyoxyalkylene copolymers according to the invention are well known in the art. For example, a polydiorganosiloxane-polyoxyalkylene copolymer can be prepared by reacting a suitable alcohol with ethylene oxide and propylene oxide (1,2-propylene oxide) to produce the polyoxyalkyene polyethers of the desired molecular weights. Suitable alcohols are hydroxy alkenyl compounds, e.g., vinyl alcohol or allyl alcohol. The above-described reaction produces a monohydroxy end-blocked polyoxyalkylene polyether in which the other end-blocking group is an unsaturated olefinic group consisting of either an allyl, a methallyl or a vinyloxy group which can be further reacted with a polydiorganosiloxane containing silicon-bonded hydrogen atoms through a hydrosilylation reaction in the presence of a platinum group catalyst.

For instance, hydroxy terminated polyoxyalkylene polyethers which are convenient starting materials in the preparation of the terpolymer can be prepared by reacting a suitable alcohol with ethylene oxide and propylene oxide (1,2-propylene oxide) to produce the polyoxyalkyene polyethers of the desired molecular weights. Suitable alcohols are hydroxy alkenyl compounds, e.g., vinyl alcohol, allyl alcohol, methallyl alcohol and the like.

The components of composition X are chosen so that the viscosity of the composition X has sufficient flowability before curing to allow the composition to be applied as a liquid within the secondary battery pack, allowing it to flow into the battery pack enclosure. In a preferred embodiment, the viscosity at 25° C. of the composition X is chosen from 100 to 10,000 mPa·s, preferably from 100 to 6,000 mPa·s.

All the viscosities under consideration in the present specification correspond to a dynamic viscosity magnitude that is measured, in a manner known per se, at 25° C., with a machine of Brookfield type. As regards to fluid products, the viscosity under consideration in the present specification is the dynamic viscosity at 25° C., known as the "Newtonian" viscosity, i.e., the dynamic viscosity that is measured, in a manner known per se, at a sufficiently low shear rate gradient so that the viscosity measured is independent of the rate gradient.

In a preferred embodiment, the isocyanate-based material A is a foam. The advantage of using the isocyanate-based material A as a foam is to provide a lighter version of such material to respond to the needs of using lighter materials in vehicles using battery pack containing secondary battery cells to maximize their driving range autonomy before the battery cells need to be recharge.

Another advantage of using a foamed version of the isocyanate-based material A according to the invention is that it has a higher thermal insulation property compared to the non-foamed material.

According to the foaming process, the obtained foam may be of different types: a closed cell foam or an open-cell foam. A closed cell foam has the advantage of being a moisture vapor barrier and will not allow moisture to pass through the foam. An open cell foam will allow moisture to pass. In a preferred embodiment, the isocyanate-based material A is a closed-cell foam.

According to another preferred embodiment, the isocyanate-based material A is a foam prepared by a mechanical foaming process step wherein a gas is added into composition X by vigorous mechanical stirring before or during curing step of composition X.

In mechanical foaming (also known as mechanical frothing), just before or during the polymerization/curing reaction, an inert gas such as air, $CO_2$, nitrogen or a mixture of preceding gases is dispersed into the starting components by vigorous agitation, which leaves entrapped air bubbles within the polymeric matrix. Mechanical foaming can include whipping, mixing, stirring, or the like. Readily available mixing equipment can be used, and no special equipment is generally necessary. The amount of inert gas beaten into the liquid phase is controlled by gas flow metering equipment to produce a froth of the desired density. The mechanical foaming maybe conducted in an Oakes mixer, or in a Hobart mixer.

According to another preferred embodiment, the isocyanate-based material A is a foam prepared by one of the following physical foaming processes:

a low-boiling-point liquid is used as a physical blowing agent and is added into composition X which is evaporated when the rise of temperature induced by the exothermic polymerization reaction of composition X is above its boiling point to yield a foamed material, eventually the mixture may be heated to rise the temperature of the mixture, or carbon dioxide ($CO_2$) is used as a physical blowing agent and is introduced, into at least one component of composition X or into composition X under a high pressure which is above the atmospheric pressure, followed by a pressure quench from higher pressure to atmospheric pressure to induce a phase separation of $CO_2$ which creates cavities and yields to a foamed material.

When carbon dioxide is used as a physical blowing it can be incorporated as a liquid, a supercritical fluid or a gas. It is preferably incorporated under elevated pressure up to 100 bars (preferably from 10 to 100 bars). The foaming process involves several steps: the dissolution of carbon dioxide in the composition X or to one of its components, preferably under an elevated pressure, the nucleation of a population of gas bubbles, preferably upon the release of pressure to the ambient pressure and finally the growth of nucleated bubbles which are entrapped in the polymer matrix. For example, when component b) is an active hydrogen-containing compound such as polyols, $CO_2$ gas is preferably added, for example at a level of 100% to 200% by volume, to the polyol or to the streamline providing the polyol to the composition X at a pressure from 10 to 20 bars, while the isocyanate is added at a high pressure (up to 100 bars, preferably from 10 to 100 bars) to the mixing chamber in which a pressure drop allow the foaming to start. In an embodiment, nitrogen is also added to the isocyanate component under high pressure (up to 100 bars) acting as a co-foaming agent.

When a low-boiling-point liquid is used as a physical foaming agent such as hydrocarbons (e.g., cyclopentane) or hydrofluorocarbons, Preference is given to low molecular weight hydrocarbons such as propane, butane, pentanes such as n-pentane or cyclopentane, dimethyl ether or fluorinated hydrocarbons such as 1,1,1,3,3-pentafluoropropane (HFC-245fa), 1,1,1,3,3-pentafluorobutane (HFC-365mfc), 1-fluorobutane, nonafluorocyclopentane, perfluoro-2-methylbutane, 1-fluorohexane, perfluoro-2,3-dimethylbutane, perfluoro-1,2-dimethylcyclobutane, perfluorohexane, perfluoroisohexane, perfluorocyclohexane, perfluoroheptane, perfluoroethylcyclohexane, perfluoro-1,3-dimethyl cyclohexane, perfluorooctane and 1,1,1,2-tetrafluoroethane (HFC-134a). They evaporate by the heat derives from the exothermic polymerization and blowing reactions.

Other suitable physical blowing agents include a hydrofluoro-olefin (HFO), such as trans-1,3,3,3-tetrafluoroprop-1-ene (HFO-1234ze, available from Honeywell under the Solstice® ze tradename), trans-1-chloro-3,3,3-trifluoropropene (HFO-1233zd, available from Arkema under the Forane™ tradename), 2,3,3,3-Tetrafluoroprop-1-ene (HFO-1234yf, available from Honeywell under the Solstice™ yf tradename, and Chemours under the Opteon™ YF tradename), cis-1,1,1,4,4,4-hexafluoro-2-butene (HFO-1336mzz-Z, available from Chemours under the Opteon™ MZ tradename), and Opteon™ 1150 (available from Chemours).

In a specific embodiment, said isocyanate-based material A is a foam obtained by foaming a composition X which is prepared by mixing a first part-A and a second part-B wherein:

the first part-A comprising:
  at least one organic compound having at least two epoxy groups or at least one active hydrogen-containing compound or a mixture of active hydrogen-containing compounds selected from the group consisting of polyols, polyamines, polyamides, polyimines and polyamines,
  at least one organopolysiloxane polymer Y comprising either as a terminal group or as a pendant group at least one polyoxyalkylene moiety end-capped by a hydroxyl group,
  at least one drying agent,
  at least one catalyst,
  optionally at least one blowing agent,
  optionally at least one adhesion promoter, and
  optionally at least one additive,
the second part-B comprising:
  at least one isocyanate compound,
and wherein for 100 parts by weight of composition X it further comprises:
from 0.1 part by weight to 20 parts by weight, preferably from 1 part by weight to 15 parts by weight and most preferably from 2.5 parts by weight to 10 parts by weight of at least one organopolysiloxane polymer Y comprising either as a terminal group or as a pendant group at least one polyoxyalkylene moiety end-capped by a hydroxyl group.

It has been found that by using a drying agent in the above part A, it allows to better control a physical foaming process using carbon dioxide as a physical blowing agent (PBA) when a foam is desired as material A by minimizing chemical foaming due to the presence of water if it is present as a blowing agent or the potential presence of water as moisture in said part A.

According to another preferred embodiment, the isocyanate-based material A is a foam prepared by a chemical foaming process step wherein at least one blowing agent is present within composition X which is foamed before or during curing step of composition X. In chemical foaming, the blowing agent is generated from a chemical reaction.

Examples of suitable chemical blowing agents include water and optionally one or more compounds selected from the group containing hydrocarbons, fluorocarbons, and fluorohydrocarbons or at least one carboxylic acid selected from formic acid and acetic acid. Typically, the addition of water in the formulation allows for the reaction of water with isocyanate, to give unstable carbamic acid that decomposes to amine and $CO_2$ as a by-product, which blows the polymer. The amount of water present in the total mass of the composition (prior to reaction) is typically from 0.02 to 2.00 wt. %, alternatively from 0.05 to 1.0 wt. %, alternatively from 0.1 to 0.7 wt. % (based on the total weight of the composition X).

Other suitable chemical blowing agents include Si—OH compounds, which may be monomers, oligomers, or polymers and in particular organosilanes and organosiloxanes having at least one silanol (Si—OH) group. Examples of suitable OH-functional compounds include dialkyl siloxanes, such as OH-terminated dimethyl siloxanes. Such siloxanes may have viscosities in the range of 10 to 5,000, 10 to 2,500, 10 to 1,000, 10 to 500, or 10 to 100, mPa*s at 25° C.

In another embodiment, the chemical blowing agent may consist of a mixture of formic acid and water. The blowing agent may also consist of a mixture of at least 60% by weight formic acid and at most 40% by weight water. The amount of blowing agent utilized can vary depending on the desired properties. For example, the amount of blowing agent can be varied to tailor final foam density and foam rise profile, as well as cell size, in the foamed article.

According to another preferred embodiment, both physical foaming process and chemical foaming (e.g., by addition of water or silanol) are used, in a combined chemical and physical foaming process.

According to a preferred embodiment, the isocyanate-based material A is a silicone-polyurethane foam, a silicone-polyurea foam, a silicone-polyisocyanurate foam or a foam made of silicone and mixtures of polyurea, polyurethane and/or polyisocyanurate prepared by the above-described processes.

As used herein a foam is defined as a material which has numerous cavities which may be filled with gas, such as air, oxygen, carbon dioxide, nitrogen, or any suitable gas. The cavities form a cellular structure throughout the bulk material. The foam can be closed-cell, open-cell or a mixture of both. Closed cell refers to a foam having cavities that form discrete cavities completely surrounded by solid material. Open cell refers to a foam having cavities that connect to each other.

According to a preferred embodiment the isocyanate-based material A is used as an interstitial fill material and as a structural adhesive which fills completely or partially the open space of the battery pack enclosure 101 and/or the open space of the array of battery cells 103 and/or partially or totally covering the battery cells 103. The heat diffusion from the unit cell to the neighboring unit cells can be effectively insulated by the isocyanate-based material A and the thermal excursions are not propagated through the entire battery pack and then threatening the safety of the user is thus prevented. In addition, for some battery packs having control circuit boards disposed in the battery pack, the isocyanate-based material A of the disclosure can be disposed between the array of battery cells and the circuit board and between the array of battery cells and the connecting circuit to reduce the battery heating problem caused by the circuit board and the connecting circuit.

Examples of components (a) of the composition X can be chosen from the group consisting of monoisocyanates, diisocyanates, polyisocyanates and their mixtures. Mention may be made, by way of illustration of component (a) of use according to the invention and having at least one isocyanate functional group, of mono-, di- or polyisocyanates which are aromatic, cyclic, saturated or aliphatic and which are well known to a person skilled in the art and the mixtures of these compounds. Suitable examples are xylene diisocyanate (XDI), tetramethylxylylene diisocyanate (TMXDI), hydrogenated xylene diisocyanate (HXDI), naphthalene 1,5-diisocyanate (NDI), 4,4'-diphenylmethane diisocyanate (MDI), in particular 4,4'-diphenylmethane diisocyanate or 2,4'-diphenylmethane diisocyanate and toluene diisocyanate (TDI), in particular 2,4-toluene diisocyanate and 2,6-toluene diisocyanate. Other suitable examples are hexamethylene diisocyanate (HMDI), 1,3-tetramethylxylylene diisocyanate, p-phenylene diisocyanate (PPDI), isophorone diisocyanate and 4,4'-dicyclohexamethylmethane diisocyanate ($H_{12}$MDI). Mention may be made, as examples of cycloaliphatic diisocyanates, of isophorone diisocyanate (IPDI).

As component (b) of the composition X to produce a polyurethane base material A or a polyisocyanurate base material A, suitable polyol compound without intending to be restricted thereto, are for example: a polyfunctional polyether (e.g., polyethylene glycol, polypropylene glycol, PTMG or polycaprolactone diol), polyester polyol (PEPO), acrylic polyol (ACPO), polycarbonate polyol, castor oil or a mixture of these. Specific examples are: glycerol, polyglycerol, glycol, propylene glycol, glycols comprising from 2 to 10 carbon atoms, preferably from 2 to 6 carbon atoms, such as ethylene glycol, diethylene glycol, 1,4-butanediol, 1,3-butanediol, 1,2-propanediol, 2,3-butanediol, 1,5-pentanediol, 1,6-hexanediol, 1,10-decanediol, 1,3-propanediol, 2-methylpropane-1,3-diol, 1,4-cyclohexane diol, 1,3-cyclohexanedimethanol, 1,4-cyclohexanedimethanol, 2,5-hexanediol, dipropylene glycol, polyethylene glycol, polypropylene glycol, neopentyl glycol, pentaerythritol, neopentyl glycol hydroxypivalate, dipentaerythritol, trimethylolpropane, 2-butyl-2-ethyl-1,3-propanediol, sorbitol, mannitol, xylitol and meso-erythritol.

Use may also be made of esters of these diols or polyester polyols and also polyether polyols. In a known way, the polyester polyols are generally chosen from aliphatic and aromatic polyester polyols and the mixtures of these compounds. Mention may be made, by way of example, of the polyester polyols resulting from the condensation of aliphatic, cyclic or aromatic polyols, such as 1,2-ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol and mannitol. The polyester polyols are generally obtained by the use of an excess of di- or polyfunctional alcohol in their polyesterification with dicarboxylic acids or carboxylic acid anhydrides. The polyether polyols are generally obtained by the anionic or cationic polyaddition of cyclic monomers, such as ethylene oxide, propylene oxide or tetrahydrofuran. The molar masses of the polyether polyols used in the synthesis of polyurethanes generally vary from 250 to 8000. Their functionality can range from 2 to 7, depending on the nature of the molecule used as initiator. The end groups of these polyether diols can be primary or secondary.

As component (b) of the composition X to produce a polyurea base material A, active hydrogen-containing compounds which may be used comprises compounds wherein hydrogen is bonded to nitrogen. Preferably such compounds are selected from the group comprising polyamines, polyamides, polyimines and polyolamines, more preferably polyamines. Exemplary polyamines include ethylene diamine; neopentyldiamine; 1,6-diaminohexane; bisaminomethyltricyclodecane; bisaminocyclohexane; diethylene triamine; bis-3-aminopropyl methylamine; triethylene tetramine; various isomers of toluene diamine, diphenylmethane diamine; N-methyl-1,2-ethanediamine, N-methyl-1,3-propanediamine; N,N-dimethyl-1,3-diaminopropane; N,N-dimethylethanolamine; 3,3'-diamino-N-methyldipropylamine; N,N-dimethyldipropylenetriamine; aminopropylimidazole; and combinations thereof. Other specific examples of such compounds include primary and secondary amine terminated polyethers. Preferably such polyethers have a molecular weight of greater than about 230, a functionality of from 1 to 3. Such amine terminated polyethers are well known and are prepared from an appropriate initiator to which a lower alkylene oxide is added with the resulting hydroxyl terminated polyol being subsequently aminated.

As component (b) of the composition X which is an organic compound having at least two epoxy groups it can be cited any aliphatic, cycloaliphatic, aromatic and/or heterocyclic compounds having at least two epoxy groups. In particular, any aromatic compound having at least two epoxy groups may be suitable. Other suitable polyepoxides include, for example, polyglycidyl ethers of polyvalent phenols, for example, of pyrocatechol, resorcinol, hydroquinone, 4,4'-dihydroxy-diphenylpropane (bisphenol A), of 4,4'-dihydroxy-3,3'-dimethyldiphenylmethane, of 4,4'-dihydroxydiphenylmethane (bisphenol F), 4,4'-dihydroxydiphenylcyclohexane, of 4,4'-dihydroxy-3,3'-dimethyldiphenylpropane, of 4,4'-dihydroxydiphenyl, from 4,4'-dihydroxydiphenylsulfone (bisphenol S) and of tris(4-hydroxyphenyl)methane. Further, there may be mentioned: polyepoxy compounds based on aromatic amines and epichlorohydrin, e.g., N-di(2,3-epoxypropyl)aniline, N,N'-dimethyl-N,N'-diepoxypropyl-4,4'-diaminodiphenylmethane or N,N-diepoxypropyl-4-aminophenyl glycidyl ether. In addition, there may be used: glycidyl esters of polyvalent aromatic, aliphatic and cycloaliphatic carboxylic acids, for example, phthalic acid diglycidyl ester, isophthalic acid diglycidyl ester, terephthalic acid diglycidyl ester, adipic acid diglycidyl ester, and glycidyl esters of reaction products of 1 mole of an aromatic or cycloaliphatic dicarboxylic acid anhydride and ½ mole of a diol, or 1/n mole of a polyol with n hydroxy groups, or hexahydrophthalic acid diglycidyl ester, which may optionally be substituted with methyl groups. Other suitable examples include glycidyl ethers of polyvalent alcohols, for example, of 1,4-butanediol, 1,4-butenediol, glycerol, trimethylolpropane, pentaerythritol and polyethylene glycol. Epoxidation products of polyunsaturated compounds, such as vegetable oils and their conversion products, may also be employed.

As component (c) of the composition X suitable catalyst is chosen among organotin compounds. As component (c) suitable catalysts are compounds capable of catalyzing the polymerization reaction. Such catalysts are known, and the choice and concentration thereof is within the knowledge of a person skilled in the art. See for example U.S. Pat. Nos. 4,296,213 and 4,518,778. Non-limiting examples of suitable catalysts include tertiary amines and/or organometallic compounds.

Additionally, as is known in the art, when the objective is to produce an isocyanurate material, a Lewis acid is preferred as the catalyst, either alone or in conjunction with other catalysts. Examples are tin(II) salts of organic carboxylic acids such as dibutyltin dilaurates (for example commercially available from Air Products and Chemicals, Inc. under the trademark DABCO™), dioctyltin dilaurate, dibutyltin diacetate, dibutyltin dioctoate and dibutyltin bis (dodecyl mercaptide). It is also possible to use tin-free catalysts, e.g. organic titanates, iron catalysts such as organic iron compounds, organic and inorganic heavy metal compounds or tertiary amines. An example of an organic iron compound is iron(III) acetylacetonate. Examples of tertiary amines are triethylamine, tri-n-butylamine, tetramethylethylene diamine, tetramethylhexanediamine, pentamethyldiethylenetriamine, pentamethyidipropylenetri amine, dimethylpiperazine, 1,2-dimethylimidazole, N-ethylmorpholine, tris(dimethylaminopropyl) hexahydro-1,3,5-triazine, dimethylaminoethanol, dimethylaminoethoxyethanol, 1,4-diazabicyclo-[2.2.2]octane, N,N-bis(N,N-dimethyl-2-aminoethyl)methylamine, N,N-dimethylcyclohexylamine ("DMCHA"), N,N-dimethylphenylamine, bis(N,N-dimethylaminoethyl)ether, N,N-dimethyl-2-aminoethanol, N,N-dimethylaminopyridine, N,N,N,N-tetra-methyl(bis(2-aminoethyl)methylamine, 1,5-diazabicyclo-[4.3.0]non-5-ene, 1,8-diazabicyclo[5.4.0]undec-7-ene ("DBU") and N-ethylmorpholine. Other suitable are, in particular, dimethylbenzylamine, methyldibenzylamine, boron trichloride tert.-amine adducts, and N-[3-(dimethylamino)propyl]formamide. The catalyst may be utilized neat or disposed in a carrier vehicle which may be referred to as a solvent. The carrier vehicle can be isocyanate-reactive, e.g. an alcohol-functional carrier vehicle, such as dipropylene glycol, silicones, both linear and cyclic, organic oils, organic solvents and mixtures of these.

The relative proportions of isocyanate groups to isocyanate-reactive groups may vary as desired, preferably within a molar ratio of [NCO]/[isocyanate-reactive groups groups] of 0.9:1 to 2:1. Preferably, the molar ratio is from 1:1 to 1.8:1, alternatively from 1.1:1 to 1.6:1, alternatively from 1.1:1 to 1.4:1.

Whereas polyurethane material is usually obtained by causing an organic isocyanate compound and polyol to react in the presence of tin catalysts or tertiary amine catalysts so as to bring the NCO/OH equivalent ratio to about 0.9-1.2, polyisocyanurate material are preferably obtained by causing their reaction in the presence of trimerization catalysts so as to bring the NCO/OH equivalent ratio to about 3.0 or greater. Examples of suitable trimerization catalysts are carboxylic acid salts such as potassium 2-ethylhexanoate.

When present, blowing agent component (d) maybe chosen among water, a hydrohaloolefin such as trans-1-chloro-3,3,3-triflouroprop-1-ene, trans 1,3,3,3-tetrafluoropropene, 1,1,1,4,4,4-hexafluorobutene or mixtures thereof. The blowing agent is often used in amounts amounting to up to 50% of the weight of the active hydrogen-containing compound.

When present, adhesion promoter (e) may be chosen among an amino-containing adhesion promoter chosen from an aminoalkyltrialkoxysilane, an aminoalkylalkyldialkoxysilane, a bis(alkyltrialkoxysilyl)amine, a tris(alkyltrialkoxysilyl)amine, or a combination of two or more thereof. Examples are N-(2-aminoethyl)aminopropyltrimethoxysilane gamma-aminopropyltriethoxysilane, gamma-aminopropyltrimethoxysilane, bis(gamma-trimethoxysilypropyl) amine, N-phenyl-gamma-aminopropyltrimethoxysilane, triaminofunctionaltrimethoxysilane, gamma-aminopropylmethyldimethoxysilane, gamma-aminopropylmethyldiethoxysilane, omega-bis-(aminoalkyl-diethoxysilyl)-polydimethylsiloxanes (Pn=1-7), alpha, omega-bis-(aminoalkyl-diethoxysilyl)-octa-methyftetrasiloxane, 4-amino-3,3, -dimethyl-butyl-tri-methoxysilane, and N-ethyl-3-trimethoxy-silyl-2-methylpropanamine, 3-(diethyl-aminopropyl)-trimethoxysilane combinations of two or more thereof, and the like. Particularly suitable amino-containing adhesion promoters include bis(alkyltrialkoxysilyl)amines and tris(alkyltrialkoxysilyl)amines including, but not limited to, bis(3-propyltrimethoxysilyl)amine and tris(3-propylt-rimethoxysilyl)amine. Other suitable adhesion promoters include vinyltrimethoxysilane, (3-glycidyloxypropyl) trimethoxysilane or the like.

When present, additive component (f) maybe chosen among flame retardant additives, smoke suppressants, antimicrobial compounds, stabilizers, plasticizers, surfactants, extenders, dyes, pigments, crosslinking additives, fragrances, detergents, fillers and anti-static agents. These optional components are well known in the art and the amount of these optional components is conventional and not critical to the instant invention.

Examples of surfactants include fluorocarbon surfactant, organic fluorinated surfactant or silicon containing fluorinated surfactant.

Examples of pigments include carbon black, e.g. acetylene black.

Examples of suitable fillers include reinforcing fillers, non-reinforcing fillers, extending fillers, or mixtures thereof. Examples of reinforcing fillers include high surface area fumed and precipitated silicas and calcium carbonate Examples of non-reinforcing fillers include crushed quartz, diatomaceous earths, barium sulphate, iron oxide, titanium dioxide and carbon black, carbon nanotubes, talc, hollow glass beads and wollastonite.

Example of hollow glass beads and in particular hollow glass microspheres include are chosen from the 3M™ Glass Bubbles Floated Series (A16/500, G18, A20/1000, H20/1000, D32/4500 and H50/10,000EPX glass bubbles products) and 3M™ Glass Bubbles Series (such as but not limited to K1, K15, S15, S22, K20, K25, S32, S35, K37, XLD3000, S38, S38HS, S38XHS, K46, K42HS, S42XHS, S60, S60HS, iM16K, iM30K glass bubbles products) sold by 3M Company.

In a preferred embodiment when the additive component (f) is present, its content for 100 parts by weight of composition X is within the range of 0.1 part by weight to 30 parts by weight, preferably from 0.5 part by weight to 15 parts by weight and most preferably from 0.5 parts by weight to 10 parts by weight.

According to a preferred embodiment, the secondary battery pack further comprises:

at least one thermally insulating material B which fills
        partially the open space of said battery pack enclosure
            101 and/or fills partially the open space within said array of battery cells 103 and/or covers partially said battery cells 103, and preferably the thermally insulating material B is in the form of foam, fabric, batting or intumescent material, and even more preferably the thermally insulating material B is a syntactic foam, a polymeric foam or a non-polymeric foam chosen from aerogels and porous ceramics, and the isocyanate-based material A is used as an adhesive and fills the remaining open space left by the thermally insulating material B.

Within such embodiment the isocyanate-based material A surrounds the battery cell array 103 in which the thermally insulating material B completely or partially filling it.

As a preferred embodiment, the thermally insulating material B is a silicone foam or a silicone syntactic foam.

According to another embodiment:

the isocyanate-based material A is used as an adhesive which fills partially the open space of said battery pack enclosure 101 and/or fills partially the open space within said array of battery cells 103 and/or covers partially said battery cells 103 and is eventually present under the battery cells 103, and the secondary battery pack further comprises at least one thermally insulating material B which is applied as a top layer and/or as a bottom layer over said isocyanate-based material A, and preferably the thermally insulating material B is in the form of foam, fabric, batting or intumescent material, and even more preferably the thermally insulating material B is a syntactic foam, a polymeric foam or a non-polymeric foam chosen from aerogels and porous ceramics.

This embodiment has the advantage of securing the battery cell array of the secondary battery pack with the isocyanate-based material A whereas the thermally insulating material B protects electrical connections, prevents arcing and reduces thermal runaway risk when cell vents upwards through weakest part of cell construct. In this embodiment the thermally insulation material B is preferably chosen from a silicone foam or a silicone syntactic foam.

As a preferred embodiment, the thermally insulating material B is a silicone foam or a silicone syntactic foam.

In a preferred embodiment, the thermally insulating material B is a polymeric foam, or a syntactic foam prepared from polymers chosen from the group consisting of silicones, epoxies, urethanes, polyimides, aromatic polyethers and sulfones. Silicone syntactic foams are the most preferred for the thermally insulating material B.

To further enhance adhesive properties, composition X preferably contains at least one adhesion promoter (e) as defined above.

Examples of suitable polymeric foam for thermally insulating material B include compositions which are foamed as described above and comprising as main components and as described above:

(a) at least one isocyanate compound, (b) at least one organic compound having at least two epoxy groups or at least one active hydrogen-containing compound or a mixture of active hydrogen-containing compounds selected from the group consisting of polyols, polyamines, polyamides, polyimines and polyolamines.

(c) at least one catalyst, (d) eventually at least one blowing agent, (e) eventually at least one adhesion promoter, and eventually at least one additive Various embodiments are possible when the isocyanate-based material A is used with the thermally insulating material B.

According to a preferred embodiment, said battery cells 103 are of lithium-ion type.

According to another preferred embodiment, the secondary battery pack according to invention, further comprising a plurality of heat dissipation members which are disposed at two or more interfaces between the battery cells or underneath the array of battery cells 103, and at least one heat exchange member integrally interconnecting the heat dissipation members, whereby heat generated from the battery cells during the charge and discharge of the battery cells is removed by the heat exchange member. It allows for cooling of the battery cells with higher efficiency than conventional cooling systems even with no spaces between the battery cells or with very small spaces between the battery cells, thereby maximizing heat dissipation efficiency of the secondary battery pack.

According to another preferred embodiment, the heat dissipation members according to the invention are made of a thermally conductive material exhibiting high thermal conductivity and the heat exchange member is provided with one or more coolant channels for allowing a coolant such as a liquid or a gas to flow there.

Heat dissipation members according to the invention are not particularly restricted as long as each of the heat dissipation members is made of a thermally conductive material such as a metal plate exhibiting high thermal conductivity.

Preferably, the heat exchange member is provided with one or more coolant channels for allowing a coolant to flow there through. For example, coolant channels for allowing a liquid coolant, such as water, to flow there through may be formed in the heat exchange member, thereby providing an excellent cooling effect with high reliability as compared with a conventional air-cooling structure.

According to another preferred embodiment, the secondary battery pack according to the invention, further comprising a coolant inlet manifold, a coolant outlet manifold and a plurality of thermal exchange tubes as heat dissipation members and extending between the inlet and outlet manifolds, said thermal exchange tubes are disposed at one or more interfaces between the battery cells and/or underneath the array of battery cells 103 and have a coolant passing through to exchange heat generated from the battery cells during the charge and discharge of the battery cells.

According to another preferred embodiment, the battery cells 103 are cylindrical cells and are arranged in a plurality of cell rows to yield an array of battery cells 103 and preferably said array is designed to yield a honeycomb like array of battery cells.

In a preferred embodiment, the secondary battery pack further contains a honeycomb like structure in which the battery cells 103 are inserted and held to form an array of battery cells 103.

The battery pack enclosure 101 composed of an enclosure top panel 104 and an enclosure bottom panel 102 which when sealed to each other provide a substantially airtight battery pack enclosure 101. It is configured to hold a plurality of battery cells. The secondary battery pack may further include a ballistic shield mounted under the electric vehicle and interposed between the battery pack enclosure and the driving surface. The ballistic shield may be fabricated from aluminum, an aluminum alloy, steel, fiberglass, a carbon fiber/epoxy composite, and/or plastic.

The battery pack enclosure 101 may be substantially airtight and may be fabricated from an aluminum, aluminum alloy or steel.

According to a preferred embodiment, the secondary battery pack according to the invention is located within a vehicle.

It is understood that the term "vehicle" as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

In another preferred embodiment, the secondary battery pack according to the invention is located in an automotive motor vehicle.

In another embodiment, the secondary battery pack according to the invention is located in an all-electric vehicle (EV), a plug-in hybrid vehicle (PHEV), a hybrid vehicle (HEV).

In another embodiment, the secondary battery pack according to the invention is located in an aircraft, a boat, a ship, a train or a wall unit.

Another object of the present invention concerns a process for preparation of a secondary battery pack according to the invention and as defined above, comprising the steps of:

a) providing a battery pack enclosure 101 composed of an enclosure top panel 104 and an enclosure bottom panel 102 which when sealed provide a substantially airtight sealed closed environment within said battery pack enclosure 101 b) positioning within the enclosure bottom panel 102 at least one array of battery cells 103 which are electrically connected to one another and are arranged in an upright manner such that axes of the cells are parallel to each other, c) introducing into the open space of the battery pack enclosure 101 and/or into the open space of the array of battery cells 103 the composition X according to the invention and as defined above, d) filling completely or partially the open space of the battery pack enclosure 101 and/or the open space of the array of battery cells 103 and/or partially or totally covering the battery cells 103 with the composition X, e) allowing the curing to occur to form the material A, and f) sealing the enclosure top panel 104 and the enclosure bottom panel 102 to provide the battery pack enclosure 101.

In a preferred embodiment, the process according to the invention comprises the steps of:

a) providing a battery pack enclosure 101 composed of an enclosure top panel 104 and an enclosure bottom panel 102 which when sealed provide a substantially airtight sealed closed environment within said battery pack enclosure 101 b) positioning within the enclosure bottom panel 102 at least one array of battery cells 103 which are electrically connected to one another and are arranged in an upright manner such that axes of the cells are parallel to each other, c) introducing into the enclosure bottom panel 102 and/or into the open space of the array of battery cells 103 the composition X according to the invention and as defined above, d) filling completely or partially the open space of the battery pack enclosure 101 and/or the open space of the array of battery cells 103 and/or partially or totally covering the battery cells 103 with the composition X, e) allowing curing and foaming to start of said composition X according to the invention and as defined in the specification, either before, during or after filling step d) to form the isocyanate-based material A which is a foam, and f) sealing the enclosure top panel 102 and the enclosure bottom panel 104 to each other to provide a substantially airtight battery pack enclosure 101.

In another preferred embodiment, the process according to the invention comprises the following steps of:

a) providing a battery pack enclosure 101 composed of an enclosure top panel 104 and an enclosure bottom panel 102 which when sealed provide a substantially airtight sealed closed environment within said battery pack enclosure 101 b) positioning within the enclosure bottom panel 102 at least one array of battery cells 103 which are electrically connected to one another and are arranged in an upright manner such that axes of the cells are parallel to each other, c) introducing into the open space of the battery pack enclosure 101 at least one thermally insulating material B or its curable precursor which after curing fills partially the open space of said battery pack enclosure 101 and/or fills partially the open space within said array of battery cells 103 and/or covers partially said battery cells 103, d) introducing into the open space of the battery pack enclosure 101 and/or into the open space of the array of battery cells 103 the composition X as defined above, e) filling the remaining open space left by the thermally insulating material B of the battery pack enclosure 101 and/or the remaining open space of the array of battery cells 103 and/or the remaining open space to cover the battery cells 103 with the composition X, f) allowing the curing to occur to form the material A, and g) sealing the enclosure top panel 104 and the enclosure bottom panel 102 to provide the battery pack enclosure 101.

In another embodiment, the thermally insulating material B is in the form of foam, fabric, batting or intumescent material, and even more preferably the thermally insulating material B is a syntactic foam, a polymeric foam or a non-polymeric foam chosen from aerogels and porous ceramics.

By "syntactic foam" it is meant a composite material comprising pre-formed hollow spheres (commonly made of glass, ceramic, polymer or metal) dispersed in a polymeric binder. Specific examples of polymeric binders are those obtained from chemical precursors bearing reactive groups which under the action of a catalyst yield to a polymeric cured material and which can be chosen in the following class of precursors comprising silicones, epoxies, urethanes, polyimides, aromatic polyethers and sulfones.

In a preferred embodiment, the thermally insulating material B is a silicone syntactic foam. Examples of suitable silicone syntactic foams are described in US patent application no US-A-2018223070 filed by Elkem Silicones USA Corp.

In a preferred embodiment, hollow glass beads are employed in the syntactic foam and function to reduce the density of the foam. Hollow glass beads, and in particular hollow glass microspheres are well suited for this application because, in addition to having excellent isotropic compressive strengths, they have the lowest density of any filler that would be useful in the manufacture of high compressive strength syntactic foam. The combination of high compressive strength and low density make hollow glass microspheres the filler with numerous advantages according to the invention.

According to one embodiment, hollow glass beads are hollow borosilicate glass microspheres also known as glass bubbles or glass microbubbles.

According to another embodiment, the hollow borosilicate glass microspheres have true densities ranging from 0.10 gram per cubic centimeter (g/cc) to 0.65 gram per cubic centimeter (g/cc).

The terms "true density" is the quotient obtained by dividing the mass of a sample of glass bubbles by the true volume of that mass of glass bubbles as measured by a gas pycnometer. The "true volume" is the aggregate total volume of the glass bubbles, not the bulk volume.

According to a preferred embodiment, hollow glass beads are chosen from the 3M™ Glass Bubbles Floated Series (A16/500, G18, A20/1000, H20/1000, D32/4500 and H50/10,000EPX glass bubbles products) and 3M™ Glass Bubbles Series (such as but not limited to K1, K15, S15, S22, K20, K25, S32, S35, K37, XLD3000, S38, S38HS, S38XHS, K46, K42HS, S42XHS, S60, S60HS, iM16K, iM30K glass bubbles products) sold by 3M Company. Said glass bubbles exhibit various crush strengths ranging from 1.72 megapascal (250 psi) to 186.15 Megapascals (27,000 psi) at which ten percent by volume of the first plurality of glass bubbles collapses. Other glass bubbles sold by 3M such as 3M™ Glass Bubbles—Floated Series, 3M™ Glass Bubbles—HGS Series and 3M™ Glass Bubbles with Surface Treatment could also be used according to the invention.

According to a preferred embodiment said glass bubbles are chosen among those exhibiting crush strengths ranging from 1.72 megapascal (250 psi) to 186.15 Megapascals (27,000 psi) at which ten percent by volume of the first plurality of glass bubbles collapses.

According to a most preferred embodiment, hollow glass beads are chosen from the 3M™ Glass Bubbles series, S15, K1, K25, iM16K, S32 and XLD3000.

In another preferred embodiment, the thermally insulating material B is a syntactic foam or a polymeric foam which can introduced into the battery pack enclosure as a liquid precursor which is cured in-situ to yield the thermally insulating material B.

The thermally insulating material B may be in the form of foams, fabrics, battings, intumescent materials. Specific examples include polymeric foams such as silicones, epoxies, urethanes, polyimides, aromatic polyethers and sulfones, and phenolic foams.

BRIEF DESCRIPTION OF THE DRAWINGS

FIGS. 1 and 2 show that battery cells 103 can be very close together in the enclosure bottom panel 102. In one embodiment of the invention the composition X according to the invention and precursor of the material A are poured into the bottom panel enclosure 102 after the array of battery cells have been placed and installed (FIG. 3, 104) and yield to the isocyanate-based material A according to the invention when it is cured (FIG. 4, 105). If a foaming process is used (mechanical, physical or chemical as described above) the material A which is a foam is obtained after curing. FIG. 5 provides a top view of an array of battery cells 103 which are cylindrical cells and are arranged in a plurality of cell rows to yield an array of battery cells 103 and said array is designed to yield a honeycomb like array of battery cells 103.

Figure 1:
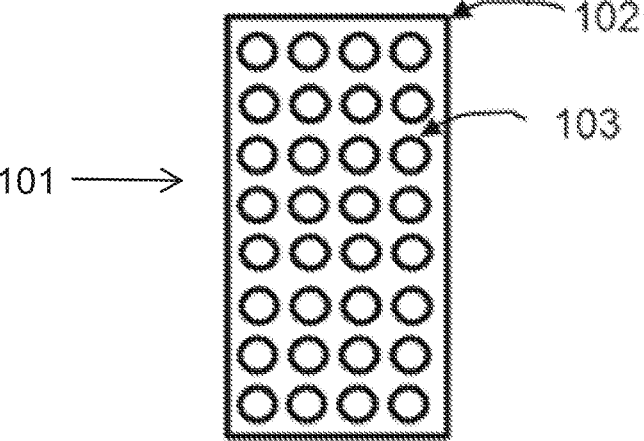
FIG. 1 provides a top view of a secondary battery pack without the enclosure top panel 104 with an array of battery cells 103 inside an enclosure bottom panel 102 (the electrical connections of the battery cells are not shown).
Figure 2:
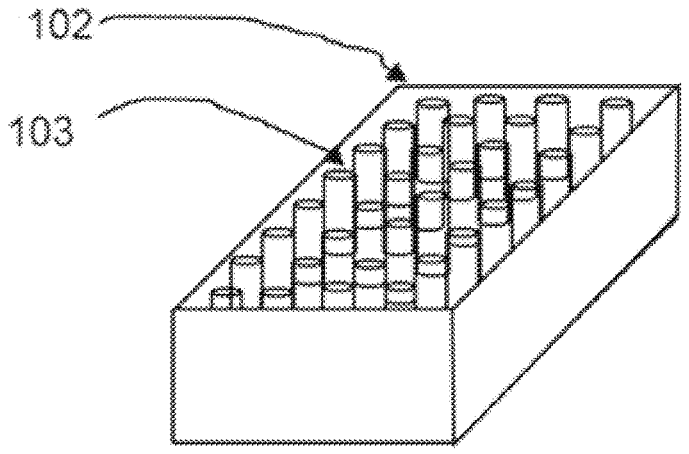
FIG. 2 provides a perspective view of a secondary battery pack with an array of battery cells 103 placed inside the enclosure bottom panel 102 (the electrical connections of the battery cells are not shown).
Figure 3:
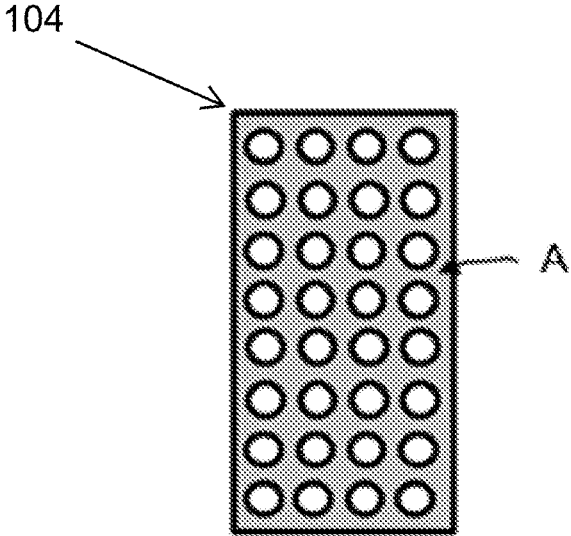
FIG. 3 provides a top view of batteries in a secondary battery pack with the isocyanate-based material A (quoted as component A in the diagram) according to the invention filling the space between the array of battery cells 103 and the remaining space in the enclosure bottom panel 102 (the electrical connections of the battery cells are not shown).
Figure 4:
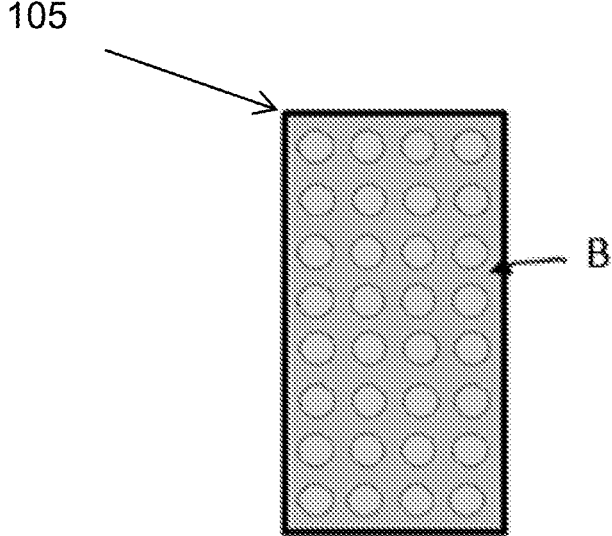
FIG. 4 provides a top view of an array of battery cells 103 in a secondary battery pack covered with the isocyanate-based material A (quoted as component B in the diagram) according to the invention and with said isocyanate-based material A filling the space between batteries and the remaining space in the pack (the electrical connections of the battery cells are not shown).
Figure 5:
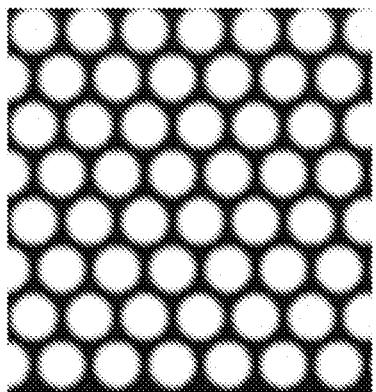
FIG. 5 provides a top view of an array of battery cells 103 which is designed to yield a honeycomb like array of battery cells 103 (the electrical connections of the battery cells are not shown).

Other advantages provided by the present invention will become apparent from the following illustrative examples.

EXAMPLES

I) Tests Procedures

Lap Shear Procedure

Stainless steel lap shears were obtained from Q labs (SS-13: 76.2"×25.4"×0.889 mm) and wiped with isopropyl alcohol prior to using to clean the surfaces to be bonded. Lap shear substrates were prepared with by applying the adhesive to the bond area on one lap shear, aligning the second lap shear on top of it to give a 12.7 mm overlap of the lap shears (bond area), and followed clamping the lap shears together on both sides of the bond/overlap area using one inch spring clamps. The finished substrates were then allowed to cure for a minimum of 4 days at room temperature and were then tested for their tensile strengths on an Instron Model 4301 according to ASTM D1005 (Elkem TL-0288) at a speed of 2 inches per minute. Five samples were run for each condition. The maximum and minimum values were discarded.

Tensile Strength and Elongation

Slabs were cast in 152×152×2 mm molds. The finished slabs were allowed to cure for a minimum of 4 days at room temperature. Specimens were then cut using a die made to Type I dimensions according to ASTM D638-14 "Standard Test Method for Tensile Properties of Plastics". Three samples were tested for Maximum Stress (quoted in Table 2 as "T&E Max Stress") and Elongation (% strain quoted as "T&E Strain (%)" in Table 2) using an Instron Model 4301 with an extensometer at a testing speed of 5.08 mm/min.

Flexural Modulus

Test specimens were cast in 147×25×3 mm molds. The finished slabs were allowed to cure for a minimum of 4 days at room temperature. Three samples for each condition were tested using a 50 mm three-point bend spacer on a Texture Analyzer with a 50 kg load cell. Flexural Modulus was calculated using ASTM D790-17 "Standard Test Methods for Flexural Properties of Unreinforced and Reinforced Plastics and Electrical Insulating Materials".

Shore D Durometer

Samples were cast in 147×25×3 mm molds. The finished slabs were allowed to cure for a minimum of 4 days at room temperature. Specimens were tested according to ASTM D2240-15 "Standard Test Method for Rubber Property—Durometer Hardness". Three specimens were tested for each formulation.

II) Definition of the Components

Stobicast M598 is a two-part polyurethane potting

Unipoly 66A (provided by Unipoly Performance Materials Co), Part A=Act as polymer matrix comprises polyether polyols, diol chain-extenders, alumina trihydrate, dibutyltin dilaurate, viscosity: <2000 mPa·s (measured at 25° C.).

Unipoly 66B (provided by Unipoly Performance Materials Co), Part B=Precursor of a polyurethane foam s (blend of di-isocyanates, catalyst, flame package, and additives).

Additive 1: Garamite-1958, Organophilic phyllosilicates (rheology additive) in powder form from BYK.

Additive 2: Stan-tone 40ET01 Blue Pigment.

Additive 3: Molsiv 3A—zeolite molecular sieve desiccant and adsorbent.

Tin Masterbatch has the following formulation (% by weight):

98.5% Unipoly 66A
0.5% Dibutyltin Dilaurate
1.0% of Additive 1

Glymo: Glycidyl 3-(trimethoxysilyl)propyl ether.

Silicone polyether 1 (control, polyether is end-capped with an acetate group): Silsurf J1015-O-AC from Siltech: INCI name is PEG/PPG 18/18 dimethicone and acetate capped having Mw=27000 g/mol (the polyether backbone has the following structure: $R=\!-\!C_3H_6O\!-\!(C_2H_4O)_{18}\!-\!(C_3H_6O)_{18}(COCH_3)$).

Silicone polyether 2 (according to the invention, polyether is end-capped with a —OH group): total OH Content (~0.595% OH by weight) with the formula: $M$ $D_{60}$ $D^*_6M$ in which
$M=(CH_3)_3SiO_{1/2}$
$D=(CH_3)_2SiO_{2/2}$
$D^*=(CH_3)(R)SiO_{2/2}$, in which $R=\!-\!C_3H_6O\!-\!(C_2H_4O)_{22}\!-\!(C_3H_6O)_{22}H$ III) Formulation and Materials Tested Samples were formulated from a Part A, a Part B and a catalyst (0.5% tin masterbatch). The composition of each Part A is given in Table 1. The Part A was mixed in a FlackTek 300 Max cup in a Speed Mixer. The Unipoly 66A and the Garamite-1958 (additive 1) were mixed first at 2000 rpm for 3 min. The pigment, GLYMO Silane and polyether were added next and mixed for 3 min at 2000 rpm. The Part A was blanketed with nitrogen and stored. Samples were prepared by hand mixing the Part A, tin catalyst, and Part B for approximately 1 min. Samples were cast in 2 mm molds coated with a mold release spray for tensile and elongation testing. A second formulation was mixed from which samples were cast in 3 mm molds and lap shear samples were made.

Each test was repeated 3 times and the properties of the resulting materials are quoted in Table 2.

TABLE 1

| | Test 1 Control | Test 2 Control | Test 3 Control | Test 4 Inv. | Test 5 Inv. | Test 6 Inv. | Test 7 Control | Test 8 Control |
|---|---|---|---|---|---|---|---|---|
| Sample formulations (all % are by weight)-(Inv. Test according to the invention) | | | | | | | | |
| Part A | | | | | | | | |
| Unipoly 66A | 94.28% | 88.57% | 84.00% | 94.27% | 88.57% | 83.91% | 97.31% | 100.00% |
| Additive 1 | 0.50% | 0.50% | 0.50% | 0.50% | 0.50% | 0.51% | 0.50% | 0.00% |
| Additive 2 | 0.50% | 0.55% | 0.50% | 0.52% | 0.50% | 0.51% | 0.55% | 0.00% |
| GLYMO | 1.62% | 1.63% | 1.61% | 1.61% | 1.63% | 1.65% | 1.63% | 0.00% |
| Silicone polyether 1 Control | 3.10% | 8.76% | 13.39% | 0.00% | 0.00% | 0.00% | 0.00% | 0.00% |
| Silicone polyether 2 Inv. | 0.00% | 0.00% | 0.00% | 3.10% | 8.79% | 13.43% | 0.00% | 0.00% |
| Total | 100% | 100% | 100% | 100% | 100% | 100% | 100% | 100% |
| Formulations obtained by mixing the Parts A, Tin Masterbatch and Unipoly 66B as shown below | | | | | | | | |
| Part A | 60.67% | 62.19% | 63.38% | 60.67% | 62.19% | 63.38% | 59.94% | 59.58% |
| Tin Masterbatch | 0.30% | 0.31% | 0.32% | 0.30% | 0.31% | 0.32% | 0.30% | 0.30% |
| Unipoly 66B | 39.02% | 37.50% | 36.31% | 39.02% | 37.50% | 36.31% | 39.76% | 40.12% |
| Total | 100% | 100% | 100% | 100% | 100% | 100% | 100% | 100% |
| % by weight of silicone polyether (control or according to the invention) in the final formulations | 1.88% | 5.45% | 8.48% | 1.88% | 5.47% | 8.51% | 0.00% | 0.00% |

TABLE 2

| | Flex Modulus (Mpa) | Shore D | Lap shear (MPa) | T&E Max Stress (MPa) | T&E Strain (%) |
|---|---|---|---|---|---|
| | | | Properties of the cured materials. | | |
| Test 1-1 Control | 1120 | 79 | 10 | 23.5 | 0.4564 |
| Test 1-2 Control | 1067 | 75 | 11 | — | — |
| Test 1-3 Control | 1167 | 79 | 12 | — | — |
| Test 2-1 Control | 637 | 73 | 13 | 7.2 | 29.58 |
| Test 2-2 Control | 504 | 71 | 13 | 7.6 | 33.07 |
| Test 2-3 Control | 551 | 71 | 14 | 7.0 | 34.63 |
| Test 3-1 Control | 253 | 72 | 11 | 7.8 | 36.32 |
| Test 3-2 Control | 318 | 74 | 11 | 7.4 | 32.43 |
| Test 3-3 Control | 287 | 73 | 11 | 7.5 | 32.81 |
| Test 5-1 Invention | 492 | 76 | 11 | 14.7 | 54.17 |
| Test 5-2 Invention | 644 | 77 | 11 | 12.5 | 53.74 |
| Test 5-3 Invention | 546 | 76 | 12 | 14.1 | 51.54 |
| Test 6-1 Invention | 363 | 80 | 12 | 10.2 | 34.93 |
| Test 6-2 Invention | 216 | 73 | 13 | 11.8 | 37.45 |
| Test 6-3 Invention | 198 | 76 | 14 | 8.5 | 39.17 |
| Test 7-1 Control | 1410 | 83 | 10 | 16.2 | 0.4564 |
| Test 7-2 Control | 1798 | 82 | 9 | 17.2 | 0.349 |
| Test 7-3 Control | 1347 | 82 | 8 | 16.8 | 2.98 |
| Test 8-1 Control | 962 | 74 | 6 | 12.6 | 3.248 |
| Test 8-2 Control | 1177 | 70 | 7 | 14.8 | 0.161 |
| Test 8-3 Control | 1207 | 75 | 3 | 18.4 | 0.483 |

Samples were formulated from a Part A, a Part B as described above with formulations described in Test 9 to Test 16 (see Tables 3 and 4). To obtain a frothed (foamed) sample via mechanical foaming: A Hamilton Beach 2 speed hand blender with a whisk attachment was used to mechanical foam. After adding Part-A in the container, the material was whipped using the blender for 30-60 secs at low speed. Part-B was then added. The material was hand mixed for about 30 sec. Then it was whipped using the blender for 30 to 60 secs at low speed. The material was then left to cure at ambient temperature and cured.

TABLE 3

| Material - Part A | Test 9 Inv. | Test 10 Control | Test 11 Inv. | Test 12 Control |
|---|---|---|---|---|
| | | Sample formulations (all % are by weight) | | |
| Unipoly 66A | 88.9 | 88.9 | 83.9 | 83.9 |
| Silicone polyether 2 (Invention) | 4 | 0 | 9 | 0 |
| Silicone polyether 1 (control) | 0 | 4 | 0 | 9 |
| Glymo | 1.6 | 1.6 | 1.6 | 1.6 |

TABLE 3-continued

| Material - Part A | Test 9 Inv. | Test 10 Control | Test 11 Inv. | Test 12 Control |
|---|---|---|---|---|
| | | Sample formulations (all % are by weight) | | |
| Additive 2 | 0.5 | 0.5 | 0.5 | 0.5 |
| Additive 3 | 5 | 5 | 5 | 5 |
| Total (% by weight) | 100 | 100 | 100 | 100 |
| | | Formulations obtained by mixing the Parts A and Unipoly 66B as shown below | | |
| Part A | 64.68 | 64.85 | 65.79 | 66.14 |
| Unipoly 66B | 35.32 | 35.15 | 34.21 | 33.86 |
| Total (% by weight) | 100 | 100 | 100 | 100 |
| % by weight of silicone polyether in final formulation | 2.59 | 2.59 | 5.92 | 5.95 |

TABLE 4

| Material - Part A | Test 13 Inv. | Test 14 Control | Test 15 Inv. | Test 16 Control |
|---|---|---|---|---|
| | | Sample formulations (all % are by weight) | | |
| Stobicast ® M598 (A) | 77.9 | 77.9 | 72.9 | 72.9 |
| Silicone polyether 2 (Inv.) | 15 | 0 | 20 | 0 |
| Silicone polyether 1 (control) | 0 | 15 | 0 | 20 |
| Glymo | 1.6 | 1.6 | 1.6 | 1.6 |
| Additive 2 | 0.5 | 0.5 | 0.5 | 0.5 |
| Additive 3 | 5 | 5 | 5 | 5 |
| Total (% by weight) | 100 | 100 | 100 | 100 |
| | | Formulations obtained by mixing the Parts A and Stobicast ® M598 (B) as shown below | | |
| Part A | 75.76 | 76.33 | 76.33 | 77.52 |
| Stobicast ® M598 (NCO part) | 24.24 | 23.67 | 23.67 | 22.48 |
| Total (% by weight) | 100 | 100 | 100 | 100 |
| % by weight of silicone Polyether in final formulation | 11.36 | 11.45 | 15.27 | 15.50 |

The properties of Tests 9 to 16 are quoted in Tables 5 and 6 below.

CF=Cohesive failure mode

AF=Adhesive failure mode

TABLE 5

| Part A | Test 9 Unfrothed Inv. | Test 9 Frothed Inv. | Test 10 Unfrothed Control | Test 10 Frothed Control | Test 11 Unfrothed Inv. | Test 11 Frothed Inv. | Test 12 Unfrothed Control | Test 12 Frothed Control |
|---|---|---|---|---|---|---|---|---|
| | | | | Properties | | | | |
| Tensile Strength, ASTM D638, 0.2 in/min (MPa) | 8.28 | 2.19 | 11.86 | 2.14 | 8.49 | 2.05 | 4.22 | 1.66 |
| Elongation, ASTM D638, 0.2 in/min (%) | 23 | 21 | 42 | 12 | 39 | 63 | 79 | 61 |
| Flexural Modulus (MPa) | 1127 | 137 | 1143 | 214 | 629 | 39 | 662 | 38 |
| Hardness (Shore D) | 84 | 77 | 83 | 76 | 82 | 67 | 79 | 64 |
| Lapshear Strength (MPa) | >13.79 | >13.79 | >13.79 | 13.14 | >13.79 | >13.79 | >13.79 | >13.79 |
| Lapshear Failure Mode | CF | CF | CF | — | CF | CF | CF | CF |
| Specific Gravity-from piece | 1.23 | 0.67 | 1.24 | 0.69 | 1.11 | 0.64 | 1.14 | 0.58 |

TABLE 6

| Part A | Test 13 Unfrothed Inv. | Test 13 Frothed Inv. | Test 14 Unfrothed Control | Test 14 Frothed Control | Test 15 Unfrothed Inv. | Test 15 Frothed Inv. | Test 16 Unfrothed Control | Test 16 Frothed Control |
|---|---|---|---|---|---|---|---|---|
| | | | | Properties | | | | |
| Tensile Strength, ASTM D638, 0.2 in/min (MPa) | 21.35 | 7.78 | 19 | 6.51 | 9.21 | 2.82 | 8.75 | 1.78 |
| Elongation, ASTM D638, 0.2 in/min (%) | 2 | 2 | 4 | 4 | 12 | 10 | 9 | 13 |
| Flexural Modulus (MPa) | 1261 | 356 | 1337 | 279 | 804 | 86 | 626 | 50 |
| Hardness (Shore D) | 83 | 73 | 85 | 72 | 84 | 66 | 81 | 63 |
| Lapshear Strength (MPa) | >13.79 | >13.79 | >13.79 | 13.14 | >13.79 | 12.85 | 11.58 | 10.96 |
| Lapshear Failure Mode | AF | CF | AF | CF | AF | AF | AF | AF |
| Specific Gravity-from piece | 1.4 | 0.91 | 1.38 | 0.85 | 1.29 | 0.81 | 1.34 | 0.81 |

For the foamed versions (frothed versions), the Tensile Strength are improved for the formulations according to the invention allowing the use of foamed products with densities below 1.0 within a battery pack.

A comparison between test 15 (frothed, invention) and 16 (frothed, control) shows an improvement of +60.67%.

A comparison between test 13 (frothed, invention) and 14 (frothed, control) shows an improvement of +19.50%.

A comparison between test 11 (frothed, invention) and 12 (frothed, control) shows an improvement of +23.49%.

The material according to the invention has the advantage of having good structural adhesive properties with improved tensile strength properties and good lap shear strength which is the ability of the material to resist forces in the plane of the bonded surfaces improving crash resistance of the structure to protect the battery cells, and more importantly, vehicle occupants.

We claim:

1. A secondary battery pack comprising:
   a battery pack enclosure composed of an enclosure top panel and an enclosure bottom panel which when sealed to each other provide a substantially airtight battery pack enclosure,
   at least one array of battery cells within said enclosure bottom panel which are electrically connected to one another and are arranged in an upright manner such that axes of the cells are parallel to each other, an isocyanate-based material which fills partially or fully an open space of said battery pack enclosure and/or fills partially or fully an open space within said array of battery cells and/or covers partially or totally said battery cells, and wherein said isocyanate-based material is prepared by mixing and curing a composition comprising:

(a) at least one isocyanate compound, (b) at least one organic compound having at least two epoxy groups or at least one active hydrogen-containing compound or a mixture of active hydrogen-containing compounds selected from the group consisting of polyols, polyamines, polyamides, polyimines and polyolamines, (c) at least one catalyst, (d) optionally at least one blowing agent, (e) optionally at least one adhesion promoter, and (f) optionally at least one additive, and wherein for 100 parts by weight of the composition it further comprises from 0.1 part by weight to 30 parts by weight of at least one organopolysiloxane polymer comprising either as a terminal group or as a pendant group at least one polyoxyalkylene moiety end-capped by a hydroxyl group.

2. The secondary battery pack according to claim 1 wherein the organopolysiloxane polymer comprises either as a terminal group or as a pendant group at least one polyoxyalkylene moiety end-capped by a hydroxyl group and wherein the polyoxyalkylene moiety has an average molecular weight of from 300 to 4000 g/mol.

3. The secondary battery pack according to claim 1 wherein the organopolysiloxane polymer comprises, either as a terminal group or as a pendant group, polyoxyalkylene moieties end-capped by a hydroxyl group and said organopolysiloxane polymer Y having the generalized average formula:

$$MD_xD^*_yT^*_zM$$

wherein

M represents: $(R)_3SiO_{1/2}$ or $R^1 (R)_2SiO_{1/2}$;

D represents $(R)_2SiO_{2/2}$;

D* represents $(R^1) (R) SiO_{2/2}$;

T* represents $(R^1) SiO_{3/2}$ x is from 5 to 220, y is from 2 to 50, z is from 0 to 50, R is an alkyl group chosen from the group consisting of methyl, ethyl, propyl, trifluoropropyl, and phenyl, $R^1$ is a hydroxyl-terminated polyether moiety of general formula:

—$C_nH_{2n}O$—$(C_2H_4O)_a$—$(C_3H_6O)_b$H, wherein n is 3 or 4, a>0 and b≥0 and wherein a and b are defined so that the average molecular weight of from 300 to 4000 g/mol.

4. The secondary battery pack according to claim 1 wherein:

the secondary battery pack further comprises at least one thermally insulating material which fills partially an open space of said battery pack enclosure (101) and/or fills partially an open space within said array of battery cells (103) and/or covers partially said battery cells (103), and wherein the at least one thermally insulating material is in the form of foam, fabric, batting or intumescent material, and wherein the at least one thermally insulating material is a syntactic foam, a polymeric foam or a non-polymeric foam chosen from aerogels and porous ceramics, and the isocyanate-based material is used as an adhesive and fills a remaining open space left by the at least one thermally insulating material.

5. The secondary battery pack according to claim 1 wherein:

the isocyanate-based material is used as an adhesive which fills partially an open space of said battery pack enclosure 101 and/or fills partially an open space within said array of battery cells 103 and/or covers partially said battery cells 103 and is optionally present under the battery cells 103, and the secondary battery pack further comprises at least one thermally insulating material which is applied as a top layer and/or as a bottom layer over said isocyanate-based material, and wherein the at least one thermally insulating material is in the form of foam, fabric, batting or intumescent material.

6. The secondary battery pack according to claim 1 wherein the isocyanate-based material is a foam.

7. The secondary battery pack according to claim 6 wherein the isocyanate-based material is a foam prepared by a mechanical foaming process step wherein a gas is added into the composition by mechanical stirring before or during curing of the composition.

8. The secondary battery according to claim 6 wherein the isocyanate-based material is a foam prepared by one of following the physical foaming processes:

a low-boiling-point liquid is used as a physical blowing agent and is added into the composition which is evaporated when a rise of temperature induced by an exothermic polymerization reaction of the composition is above the boiling point of the composition to yield a foamed material, or carbon dioxide ($CO_2$) is used as a physical blowing agent and is introduced, into at least one component of the composition or into the composition under a high pressure which is above atmospheric pressure, followed by a pressure quench from higher pressure to atmospheric pressure to induce a phase separation of $CO_2$ which creates cavities and yields to a foamed material.

9. The secondary battery according to claim 6 wherein said isocyanate-based material is a foam obtained by foaming a composition which is prepared by mixing a first part-A and a second part-B wherein:

the first part-A comprising:

at least one organic compound having at least two epoxy groups or at least one active hydrogen-containing compound or a mixture of active hydrogen-containing compounds selected from the group consisting of polyols, polyamines, polyamides, polyimines and polyolamines, at least one organopolysiloxane polymer Y comprising either as a terminal group or as a pendant group at least one polyoxyalkylene moiety end-capped by a hydroxyl group, at least one drying agent, at least one catalyst, optionally at least one blowing agent, optionally at least one adhesion promoter, and optionally at least one additive, the second part-B comprising:

at least one isocyanate compound, and wherein for 100 parts by weight of the composition it further comprises: from 0.1 part by weight to 20 parts by weight of at least one organopolysiloxane polymer comprising either as a terminal group or as a pendant group at least one polyoxyalkylene moiety end-capped by a hydroxyl group.

10. The secondary battery pack according to claim 6 wherein the isocyanate-based material is a foam prepared by a chemical foaming process step wherein at least one blowing agent is present within the composition which is foamed before or during curing of the composition.

11. The secondary battery pack according to claim 6 wherein the isocyanate-based material is a foam prepared by a physical foaming process and a chemical foaming process.

12. The secondary battery pack according to claim 4 wherein the at least one thermally insulating material is a silicone syntactic foam.

13. The secondary battery pack according to claim 1 wherein the battery cells are cylindrical cells and are arranged in a plurality of cell rows to yield an array of battery cells.

14. The secondary battery pack according to claim 1 further comprising a honeycomb structure in which the battery cells are inserted and held to form an array of battery cells.

15. The secondary battery pack according to claim 1 wherein the battery cells are lithium-ion battery cells.

16. The secondary battery pack according claim 1 which is located within a vehicle.

17. The secondary battery pack according to claim 1 which is located in an automotive motor vehicle.

18. The secondary battery pack according to claim 1 which is located in an all-electric vehicle (EV), a plug-in hybrid vehicle (PHEV), or a hybrid vehicle (HEV).

19. The secondary battery pack according to claim 1 which is located in: an aircraft, a boat, a ship, a train or wall unit.

20. A process for preparation of a secondary battery pack as defined in claim 1 comprising:

a) providing the battery pack enclosure composed of an enclosure top panel and an enclosure bottom panel which when sealed provide a substantially airtight sealed closed environment within said battery pack enclosure b) positioning within the enclosure bottom panel the at least one array of battery cells which are electrically connected to one another and are arranged in an upright manner such that axes of the cells are parallel to each other, c) introducing into the open space of the battery pack enclosure and/or into the open space of the array of battery cells the composition as defined in claim 1, d) filling completely or partially the open space of the battery pack enclosure and/or the open space of the array of battery cells and/or partially or totally covering the battery cells with the composition, d) allowing the curing to occur to form a material, and e) sealing the enclosure top panel and the enclosure bottom panel to provide the battery pack enclosure.

21. A process for preparation of a secondary battery pack as defined in claim 1 comprising:

a) providing the battery pack enclosure composed of an enclosure top panel and an enclosure bottom panel which when sealed provide a substantially airtight sealed closed environment within said battery pack enclosure b) positioning within the enclosure bottom panel the at least one array of battery cells which are electrically connected to one another and are arranged in an upright manner such that axes of the cells are parallel to each other, c) introducing into the enclosure bottom panel and/or into the open space of the array of battery cells the composition as defined in claim 1, d) filling completely or partially the open space of the battery pack enclosure and/or the open space of the array of battery cells and/or partially or totally covering the battery cells with the composition, e) allowing curing and foaming to start of said composition either before, during or after filling step d) to form the isocyanate-based material which is a foam, and f) sealing the enclosure top panel and the enclosure bottom panel to each other to provide a substantially airtight battery pack enclosure.

* * * * *